(12) United States Patent
Sato (10) Patent No.: US 6,420,852 B1
(45) Date of Patent: *Jul. 16, 2002

(54) BATTERY PACK

(75) Inventor: Bunya Sato, Fukushima (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/377,373

(22) Filed: Aug. 19, 1999

(30) Foreign Application Priority Data

Aug. 21, 1998 (JP) .......................... 10-236087

(51) Int. Cl.⁷ ............................................. H02J 7/00
(52) U.S. Cl. ..................................................... 320/134
(58) Field of Search ................ 320/116, 122, 320/132, 136, 134

(56) References Cited

U.S. PATENT DOCUMENTS

| 4,017,779 A | | 4/1977 | McDonald et al. ......... 320/126 |
| 4,633,418 A | * | 12/1986 | Bishop ........................ 320/136 |
| 4,935,315 A | * | 6/1990 | Herrin ......................... 429/50 |
| 5,710,503 A | * | 1/1998 | Sideris et al. ............... 320/116 |
| 5,744,936 A | | 4/1998 | Kawakami ................... 320/120 |
| 5,898,291 A | | 4/1999 | Hall ............................ 320/121 |
| 6,031,354 A | * | 2/2000 | Wiley et al. ................. 320/132 |
| 6,046,514 A | * | 4/2000 | Rouillard et al. ........... 320/122 |
| 6,051,955 A | * | 4/2000 | Saeki et al. ................. 320/120 |

FOREIGN PATENT DOCUMENTS

| EP | 0 372 823 | 6/1990 |
| EP | 0 880 214 | 11/1998 |
| WO | WO 96 22625 | 7/1996 |

* cited by examiner

Primary Examiner—Jessica Han
Assistant Examiner—Pia Tibbits
(74) Attorney, Agent, or Firm—Frommer Lawrence & Haug LLP; William S. Frommer; Joe H. Shallenburger (57) ABSTRACT

When any one or ones of at least two cells connected in parallel together is judged to be faulty by a cell failure detector, it is electrically disconnected to the normal other cells. Alternatively, when any one or ones of at least two cells connected in series together is judged to be faulty by a controller, a cell current interrupter is shifted from a connected position to a disconnected position connected in series to the faulty cell to interrupt a current line while a cell short-circuit device connected in parallel to the faulty cell by the cell current interrupter is shifted from a disconnected position to a connected position, thereby shorting a circuit portion corresponding to the faulty cell.

17 Claims, 7 Drawing Sheets

BATTERY PACK

BACKGROUND OF THE INVENTION

1. Field of the Invention

The present invention relates to a battery pack consisting of at least two cells connected in parallel and/or in series together, and more particularly, to a battery pack adapted such that if any one of a plurality of cells incorporated therein becomes faulty, it is electrically disconnected from the normal other cells.

2. Description of Related Art

A small portable electronic apparatus such as a portable personal computer (will be referred to as "portable PC" hereinunder), personal telephone or the like uses a battery pack as a power source. Such a battery pack ordinarily consists of one or more up to 9 cells electrically connected in parallel and/or in series. For example, a battery pack destined for use as a drive power source for a portable PC has been proposed which incorporates therein three series-connected cell units each consisting of two cells electrically connected in parallel to each other (a battery pack of this type will be referred to as "2-parallel/3-series battery pack" hereinunder). Assume that in such a 2-parallel/3-series battery pack, each of the cells has a capacity of 4 V, for example. A total voltage the battery pack as a whole can provide is 12 V (=4V×3) since the cells are connected in parallel together in each cell unit while three such cell units are connected in series together in this battery pack. Also, for example, a battery pack destined for use to drive a portable telephone has been proposed which consists of two cells electrically connected in parallel to each other (a battery pack of this type will be referred to as "2-parallel battery pack" hereinunder).

In addition to the above types of battery packs, the conventional battery packs having heretofore been proposed include a one having to be able to supply a large current, for example, a battery pack destined for use as an electromobile drive battery and consisting, for such a purpose, of 10 or more up to 100 cells connected in series together. As such an electromobile drive battery, there has been proposed a one consisting of 48 cells, for example, electrically connected in series together (will be referred to as "48-series battery pack" hereinunder). If each of the 48 cells has a capacity of 4 V, for example, the 48-series battery pack can totally provide a voltage of 192 V (=4 V×48) since the 48 cells are connected in series together in the battery pack.

In addition to the above-mentioned 2-parallel/3-series battery pack for the portable PC, a battery pack in which three cells are electrically connected in series together (will be referred to as "3-series battery pack" hereinunder) has also been proposed for use with portable PCs. It is assumed that in such a 3-series battery pack, each of the cells has a capacity of 4 V, for example. The battery pack as a whole can provide a total voltage of 12 V (=4V×3) as in the above-mentioned 2-parallel/3-series battery pack since the cells are connected in series together in this battery pack.

In the conventional battery pack in which at least two cells are connected in parallel together (which will be referred to simply as "parallel-type battery pack" hereinunder), such as the above-mentioned 2-parallel/3-series battery pack, 2-parallel battery pack and the like, however, if any one of the cells becomes faulty, the whole battery pack cannot be used.

The above will be described more particularly below. If any one of the cells connected in parallel together in the above-mentioned parallel-type battery pack is internally short-circuited or otherwise fails, the discharge current from the normal other cells will continuously flow to the faulty cell. Thus, if the faulty cell is left as it is in the parallel-type battery pack, the voltages in the normal other cells connected in parallel to the faulty one will become 0 V in a certain time. That is to say, the failure of one of the cells in a battery pack will cause the battery pack to wholly be unusable.

Also in a battery pack in which at least two cells are connected in series together (will be referred to simply as "series-type battery pack" hereinunder) such as the aforementioned 48-series battery pack, 3-series battery pack or the like, if any one of the cells is internally short-circuit or otherwise fails, the battery pack cannot wholly be used.

More specifically, if any one of the cells connected in series together in the above-mentioned series-type battery pack is internally short-circuited or otherwise fails, it will generate abnormally much heat and thus become hot. Thus, in the series-type battery pack, if the faulty cell is left as it is, its temperature will continuously be elevated to a point at which the safety device for that cell is activated to electrically shut off a current to the faulty cell. Namely, if any one of the cells used in a battery pack becomes faulty due to such an internal shortage or the like, it will cause the battery pack to wholly become unusable.

Further, the series-type battery packs include a one having a function to monitor the temperature of each of the cells used therein. In the battery pack with the temperature monitoring function, however, when a temperature elevation of one of the cells incorporated in the battery pack due to its abnormal heat generation, the battery pack itself is judged to be abnormal and thus the charging and discharging are stopped, so that the whole battery pack becomes unusable.

Furthermore, as one of the series-type battery packs, there has been proposed a battery pack adapted to electrically disconnect any one of the cells used therein, which is found faulty, from the normal other cells. Assume for example that such a battery pack is applied to a 48-series battery pack destined to drive an electromobile. In this case, if one of the cells in the 48-series battery pack becomes faulty and the failure is detected, the current through the whole battery pack is interrupted and thus the battery pack is wholly unusable.

As will be understood from the foregoing, the larger the number of cells used in a battery pack, the higher the failure rate of the battery pack itself becomes. The battery pack has a correspondingly lower reliability. More particularly, the total failure rate of a conventional battery pack is a product of a failure rate of one of cells used in the battery pack and a number of the cells. For example, a battery pack using 48 cells of 0.1% in failure rate will have a total failure rate of 4.8%.

SUMMARY OF THE INVENTION

Accordingly, the present invention has an object to overcome the above-mentioned drawbacks by providing a highly reliable battery pack consisting of at least two cells and which can totally be used even if any one of the cells becomes faulty.

The above object can be attained by providing a battery pack comprising at least two cells connected in parallel together, having according to the present invention:

means for judging individually the cells to detect whether they are normal or faulty;

a cell or cells, if any thus found faulty, being electrically disconnected from the normal other cells.

In the above battery pack, the individual cells are judged to detect whether they are normal or faulty and a cell or cells thus found faulty is electrically disconnected from the normal other cells. The battery pack as a whole is allowed by the normal other cells to continuously work normally. Therefore, the battery pack has an improved reliability.

Also the above object can be attained by providing a battery pack comprising at least two series-connected cell units each consisting of at least two cells connected in parallel together, the battery pack having according to the present invention:

means for judging individually the cells to detect whether they are normal or faulty;

in the cell unit including a faulty cell or cells, the faulty cell being electrically disconnected from the normal other cells; and in the cell unit including no faulty cell or cells, the normal cells as many as the faulty cells electrically disconnected from the normal other cells in the cell unit including the faulty cells, being electrically disconnected from the other cells.

In the above battery pack, it is possible to prevent a voltage imbalance between the two or more cell units, thereby permitting a safety use of a battery pack comprising many cells.

Further the above object can be attained by providing a battery pack comprising at least two cells connected in series together, having according to the present invention:

means for judging individually the cells to detect whether they are normal or faulty; and a cell short-circuiting means consisting of a first switching element connected in series to each of the cells, and a second switching element connected in parallel to each of the cells via a current interrupting element. This battery pack is adapted such that, when the cell failure detecting means judges any one of the cells to be faulty, the first switching element in the cell short-circuiting means is shifted from a connected position to a disconnected position from each cell to interrupt a current line to each cell while the second switching element is shifted from a disconnected position to a connected position to short a circuit portion corresponding to a current line connected to the faulty cell.

In the above battery pack, only a faulty cell is electrically disconnected from the normal other cells in such a manner that the latter will be charged and discharged. Thus the battery pack is allowed to continuously work normally with an improved safety.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
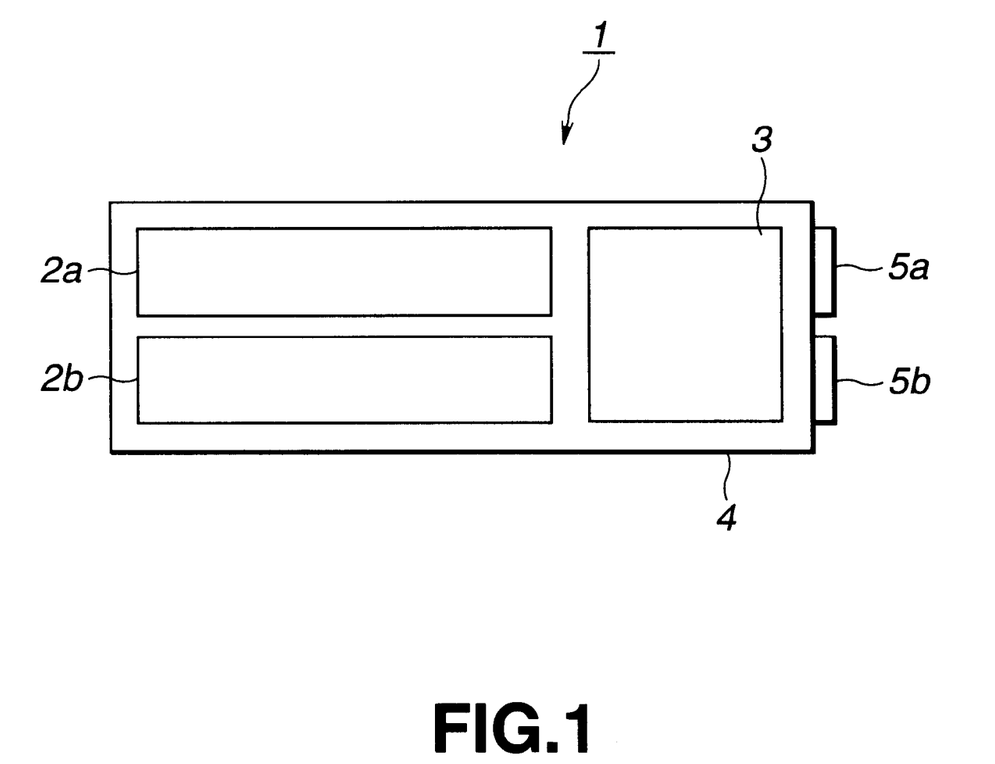
FIG. 1 is a schematic view of the internal structure of an embodiment of battery pack according to the present invention.

Referring now to FIG. 1, there is illustrated a battery pack according to the present invention. The battery pack is generally indicated with a reference 1. The battery pack comprises a plurality of cells connected in parallel together. As shown in FIG. 1, the battery pack 1 comprises two cells 2a and 2b (the cells will be generically called "cell or cells 2" hereinunder unless it is necessary to refer to them separately), a protective circuit 3, a container 4 in which the cells 2 and protective circuit 3 are encased, and an external terminal 5 disposed at one end of the container 4 and connected to an apparatus which uses the battery pack 1 as a power source or a battery charger (both not shown) to which the batter pack 1 is to be connected.

Figure 2:
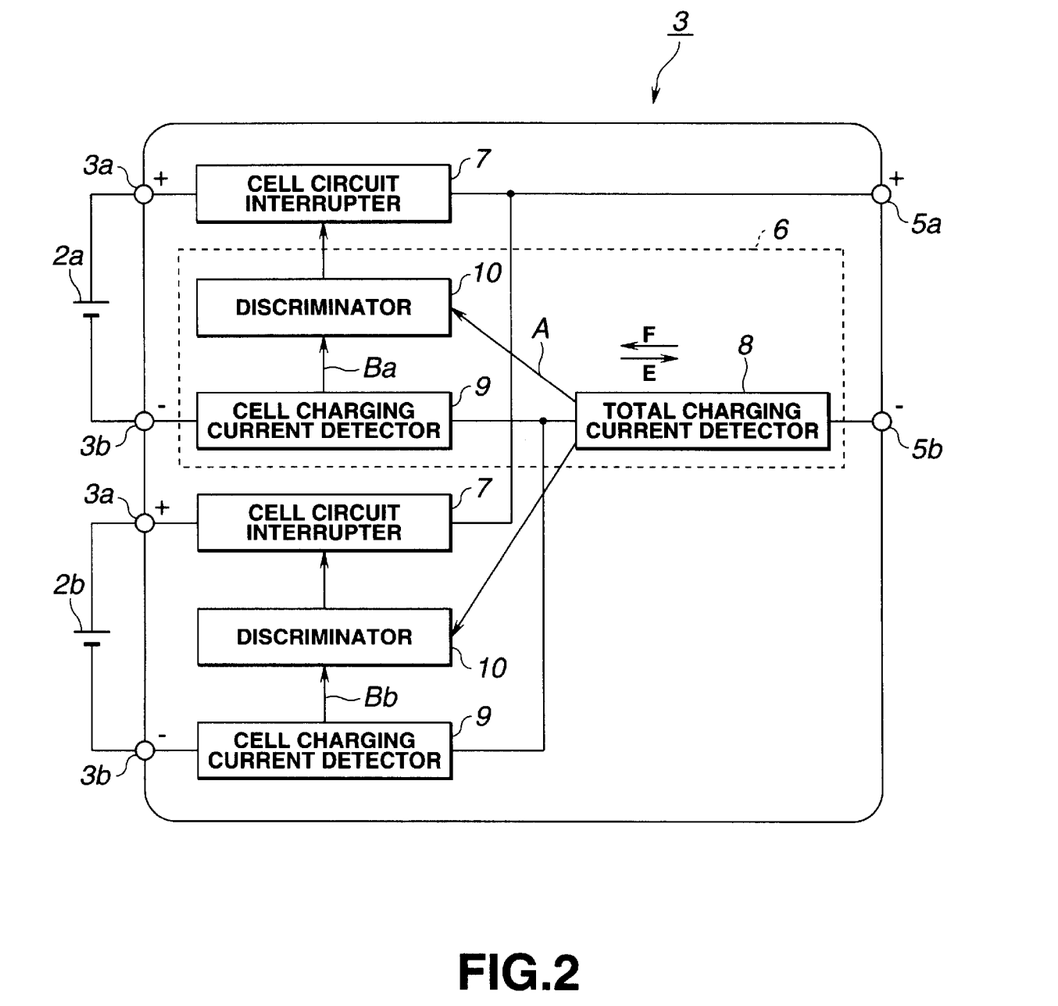
FIG. 2 is a circuit diagram of the battery pack in FIG. 1.

The cells 2 are lithium-ion secondary cells, and connected in parallel to each other by the protective circuit 3 as shown in FIG. 2. In this embodiment, the battery pack 1 consists of the two cells 2a and 2b connected in parallel to each other. However, the present invention is not limited to this embodiment but the battery pack according to the present invention may comprise more than two cells 2 connected at least in parallel together.

The cells 2 may not necessarily be a lithium-ion secondary cell. They may be any other secondary cell including a nickel-cadmium cell, nickel-hydrogen cell, lithium-polymer cell, lead cell or the like. Also, they may be a primary cell such as manganese cell, alkaline cell, lithium cell or the like.

The protective circuit 3 has the cells 2a and 2b connected to positive terminals 3a and negative terminals 3b, respectively, thereof provided for the built-in cells. The protective circuit 3 is composed of a cell failure detector 6 to judge whether the cells 2 are normal or not, and a cell circuit interrupter 7 provided for each of the cells 2a and 2b to electrically disconnect a current line connected to one cell 2 thus found faulty from a current line connected to the normal other cell 2.

The cell failure detector 6 judges whether each of the cells 2a and 2b composing together the battery pack 1 is faulty or not due to an internal shortage or the like. The cell failure detector 6 comprises a total charging current detector 8 to detect a charging current value A of the whole battery pack 1, cell charging current detectors 9 to detect charging current values B (or Ba and Bb) of the cells 2a and 2b, respectively, and discriminators 10 which are supplied with charging current value outputs A and B from the total charging current detector 8 and cell charging current detectors 9, respectively.

The total charging current detector 8 is disposed just before a negative terminal 5b of the external terminal 5 to detect a charging current A to the whole battery pack 1. At this time, when the current in the whole battery pack 1 flows in the charging direction, namely, when the current flows in the direction of arrow E in FIG. 2, the total charging current detector 8 will detect a positive value. On the contrary, when the current in the whole battery pack 1 flows in the discharging direction, that is, when the current flows in the direction of arrow F in FIG. 2, the total charging current detector 8 will detect a zero value. The total charging current detector 8 supplies the discriminators 10 with a charging current value A detected during charging or discharging.

The cell charging current detectors 9 are connected in series to the cells 2a and 2b, respectively, of the battery pack 1 to detect the charging currents Ba and Bb, respectively, in the cells 2a and 2b. At this time, when the current in the cells 2a and 2b flows in the charging direction, the cell charging current detectors 9 detect a positive value. When the current in the cells 2a and 2b flows in the discharging direction, the cell charging current detectors 9 detect a zero value.

The cell charging current detectors 9 supply the discriminators 10 with the charging current values Ba and Bb detected during charging or discharging.

The discriminators 10 compare the charging current values Ba and Bb supplied from the cell charging current detectors 9, respectively, with a predetermined reference value to judge whether the cells 2a and 2b are normal or faulty. More specifically, if the charging currents values Ba and Bb from the cell charging current detectors 9, respectively, are larger than 0 mA and a reference value C indicating that a current flows, for example, if they are larger than 10 mA and a reference value D being a product of the charging current value A from the total charging current detector 8 and a predetermined ratio, the discriminators 10 judge that any one of the cells incurs an internal shortage. The ratio necessary for calculation of the reference value D is determined depending upon the number of cells connected in parallel together in the battery pack 1. It should be noted that in this embodiment, since the two cells 2a and 2b are connected in parallel to each other and the current flowing through each of the cells 2a and 2b is approximately 50% of the total charging current A in the battery pack 1, the charging current value A is multiplied by a ratio larger than 50%, namely, 60%, to calculate the reference value D.

The discriminators 10 compare the above-mentioned charging current values Ba and Bb with the reference value C or D, or with both to judge whether the cells 2 are normal or faulty, and provide the cell circuit interrupters 7 with a command for interruption or non-interruption the current lines.

The cell circuit interrupters 7 are disposed in the proximity of the positive terminals 3a, respectively, connected to the cells 2a and 2b, and connected in series to the cells 2a and 2b. Receiving a current line interruption command supplied from the discriminator 10 of the cell failure detector 6, the cell circuit interrupters 7 interrupt the charging/discharging current lines to which the cell 2 judged to be faulty is connected, thereby electrically disconnecting the faulty cell 2 from the battery pack 1. It should be noted that the cell circuit interrupters 7 may be composed each of either a current interrupting element which is not re-connectable into circuit once electrically disconnected, namely, of a non-resettable type, or a current interrupting element which is re-connectable into circuit after the faulty cell is recovered from a failure, that is, of a resettable type.

The external terminal 5 consists of the positive and negative terminals 5a and 5b. The external terminal 5 is provided to discharge or charge the cells 2a and 2b encased in the container 4 when the battery pack 1 is connected to a load apparatus or a battery charger.

Figure 3:
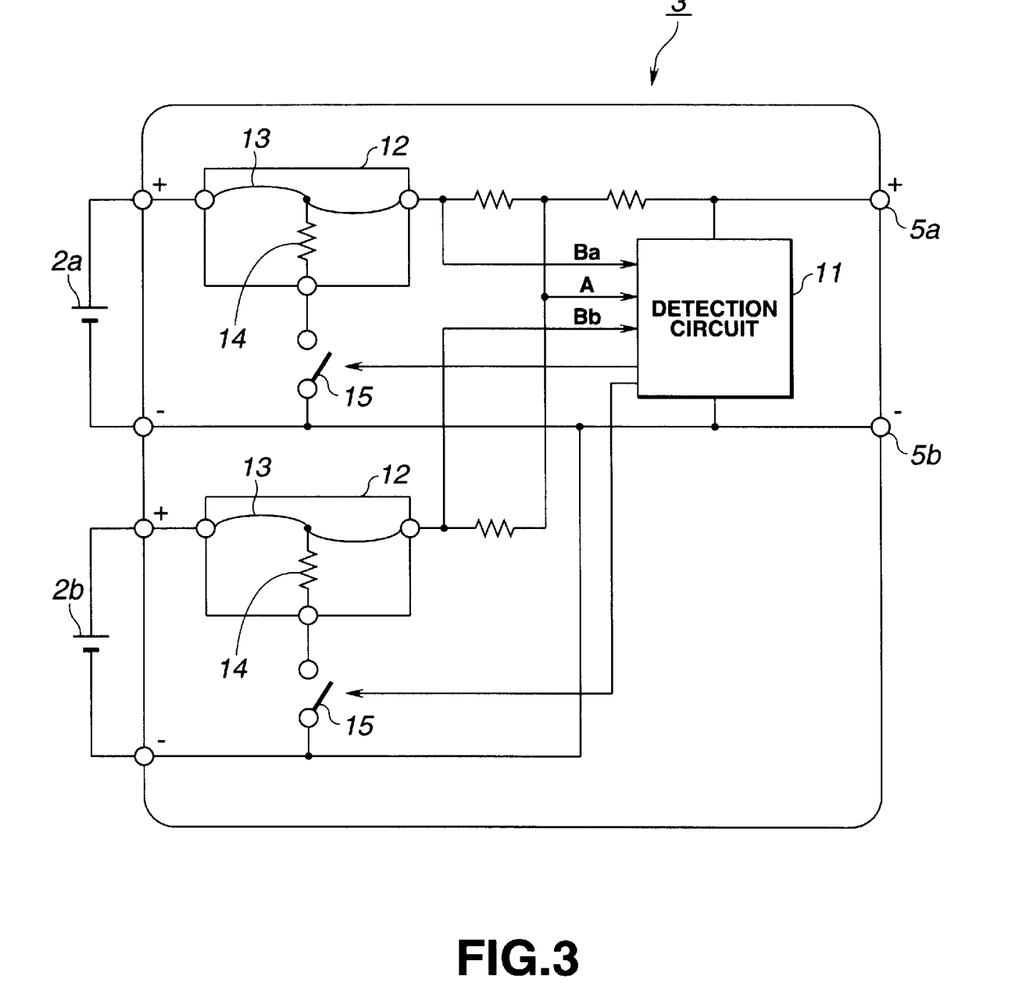
FIG. 3 is a circuit diagram of a battery pack in which non-resettable fuses each with a heater are used as a cell failure detector and cell circuit interrupter, respectively.

The battery pack 1 constructed as having been described in the foregoing operates during discharging, charging and unused status in which neither discharging nor charging is done, as will be described below:

Note that in the battery pack 1 explained herebelow concerning the operation thereof, the cell failure detector 6 is formed from a detection circuit 11 which detects the charging current values A, Ba and Bb to judge whether the cells 2a and 2b are normal or faulty, as shown in FIG. 3. Also in the battery pack 1 involved in the following functional description, each of the cell circuit interrupters 7 comprises a fuse 12 with a heater. The fuse 12 interrupts the current line when any of the cells 2 becomes faulty. The fuse with heater 12 forming the cell circuit interrupter 7 consists of a fuse 13 connected in series to the cell 2a (2b), a resistor 14 connected at a middle point of the fuse 13, and a switch 15 connected to the resistor 14 to control the flow of a current to the resistor 14. The fuse with heater 12 works as follows. That is to say, when the switch 15 is closed under a current line interruption command supplied from the detection circuit 11 having judged that any of the cells 2 is faulty, the resistor 14 heated by a current flowing through it causes the fuse 12 to blow, thereby electrically disconnecting the faulty cell 2 from the other cell 2.

For the convenience of the illustration and explanation that will be made herebelow of the present invention, it is assumed that in the battery pack 1 taken herein by way of example, the total charging current value A is 500 mA and an internal shortage will cause the charging current to increase up to about 400 mA.

First, how the protective circuit 3 operates when both the cells 2a and 2b are not faulty will be described herebelow:

In the battery pack 1, if both the cells 2a and 2b are not faulty, the charging current values Ba and Bb to the cells 2a and 2b are zero as detected by the detection circuit 11 when the battery pack 1 connected to a load apparatus discharges the charged potential to the apparatus. Based on the result of detection, the detection circuit 11 compares the charging current values Ba and Bb with the reference value C (preset to 10 mA), recognizes that the charging current values Ba and Bb are smaller than the reference value C, and issues a command for keeping the switch 15 of the fuse with heater 12 at the off position, namely, at the disconnected position.

Also, during charging with the battery pack 1 connected to a battery charger, each of the charging current values Ba and Bb is 250 mA being about 50% of the total charging current value A, as detected by the detection circuit 11. During the unused status in which the battery pack 1 is not connected to a load apparatus or a battery charger, each of the charging current values Ba and Bb is about 0 mA as detected by the detection circuit 11. Based on the result of detection, the detection circuit 11 compares the charging current values Ba and Bb with the reference value C, or with both the reference value C and a reference value D preset to 300 mA being 60% of the total charging current value A, recognizes that the charging current values Ba and Bb detected during charging are larger than the reference value C and smaller than the reference value D and that the charging current values Ba and Bb detected during the unused status are smaller than the reference value C, and issues a command for keeping the switch 15 of the fuse with heater 12 at the off position, namely, at the disconnected position, as during discharging.

Next, how the protective circuit 3 operates when the cell 2a incurs an internal shortage will be described herebelow:

Assume here that in the battery pack 1, the cell 2a incurs an internal shortage. In this case, when the battery pack 1 is discharged, a discharging current will flow into the cell 2a from the cell 2b not internally short-circuited. So, the charging current value Ba to the cell 2a is 400 mA as detected by the detection circuit 11. Based on the result of detection, the detection circuit 11 compares the charging current value Ba with the reference value C and recognizes that the charging current value Ba is larger than the reference value C. Then, the detection circuit 11 issues a current interrupting command to the switch 15 of the fuse with heater 12 connected to the cell 2a to shifting the switch 15 from the off position to the on position, namely, to the connected position so that a current flows to the resistor 14. In the battery pack 1, the resistor 14 heated with the current flowing through it will cause the fuse 13 to blow, so that the current line to which the cell 2a is connected is interrupted and thus the cell 2a is electrically disconnected from the cell 2b.

On the other hand, during discharging of the battery pack 1, the charging current Bb to the cell 2b is 0 mA as detected by the detection circuit 11. Based on the result of detection, the detection circuit 1 I compares the charging current value Bb with the reference value C and recognizes that the charging current value Bb is smaller than the reference value C. Then the detection circuit 11 issues a command for keeping at the off position the switch 15 of the fuse with heater 12 connected to the cell 2b.

Also during charging of the battery pack 1, the charging current Ba to the cell 2a is 400 mA as detected by the detection circuit 11 as mentioned above. Based on the result of detection, the detection circuit 11 compares the charging current value Ba with both the reference values C and D and recognizes that the charging current Ba is larger than the reference values C and D. Then the detection circuit 11 issues a current interrupting command to the switch 15 of the fuse with heater 12 connected to the cell 2a as in the discharging of the battery pack 1, to shift the switch 15 from the off position to on position. Thus the fuse 13 is blown off to electrically disconnect the cell 2a from the cell 2b.

On the other hand, when the battery pack 1 is charged, the charging current Bb to the cell 2b detected by the detection circuit is 100 mA. Based on the result of detection, the detection circuit 11 compares the charging current value Bb with the reference value D and recognizes that the charging current value Bb is smaller than the reference value D. Then the detection circuit 11 issues a command for keeping at the off position the switch 15 of the fuse with heater 12 connected to the cell 2b.

When the battery pack 1 is not used, the charging current Ba to the cell 2a is 400 mA as detected by the detection circuit 11. Based on the result of detection, the detection circuit 11 compares the charging current value Ba with both the reference value C and the reference value D set to 0 mA being 60% of 0 mA which is the charging current value A when the battery pack 1 is not used and recognizes that the charging current value Ba is larger than the reference values C and D. Then, the detection circuit 11 issues a current interrupting command to the switch 15 of the fuse with heater 12 connected to the cell 2a as in the discharging and charging of the battery pack 1, to shift the switch 15 from the off position to the on position, thereby allowing the fuse 13 to blow to electrically disconnect the cell 2a from the cell 2b.

On the other hand, when the battery pack 1 is not used, the charging current Bb to the cell 2b is zero as detected by the detection circuit 11. Based on the result of detection, the detection circuit 11 compares the charging current value Bb with the reference value C and recognizes that the charging current value Bb is smaller than the reference value C. Then the detection circuit 11 issues a command for keeping at the off position the switch 15 of the fuse with heater 12 connected to the cell 2b.

As aforementioned, only the cell 2a becoming faulty during discharging, charging and unused status of the battery pack 1 is electrically disconnected while the cell 2b not faulty is kept connected in circuit. Thus, even if any of the cells 2 connected in parallel to each other in the battery pack 1 has become faulty, the battery pack 1 can be discharged and charged with the other cell not faulty, so that the battery pack 1 can continuously be used normally.

In the foregoing, the present invention has been described concerning the embodiment of battery pack 1 composed of the two cells 2a and 2b connected in parallel to each other, by way of example. However, the present invention is not limited to this embodiment but can be applied to a battery pack comprising, for example, more than two series-connected cell units each containing more than two cells connected in parallel together. Also in such a battery pack, a total charging current value of the battery pack and charging current value of each of the cells are detected and compared with predetermined reference values to judge whether the cells are normal or faulty, and a one or ones of the cells which is judge to be faulty is electrically disconnected from the normal other cells, as in the battery pack 1 having been described in the foregoing. A battery pack comprising a plurality of series-connected such cell units is controlled so that to prevent a voltage imbalance between the cell units when faulty cells are electrically disconnected in one of the cell units, cells as many as the faulty cells are electrically disconnected also in the other cell units to which the faulty cells are not connected.

Figure 4:
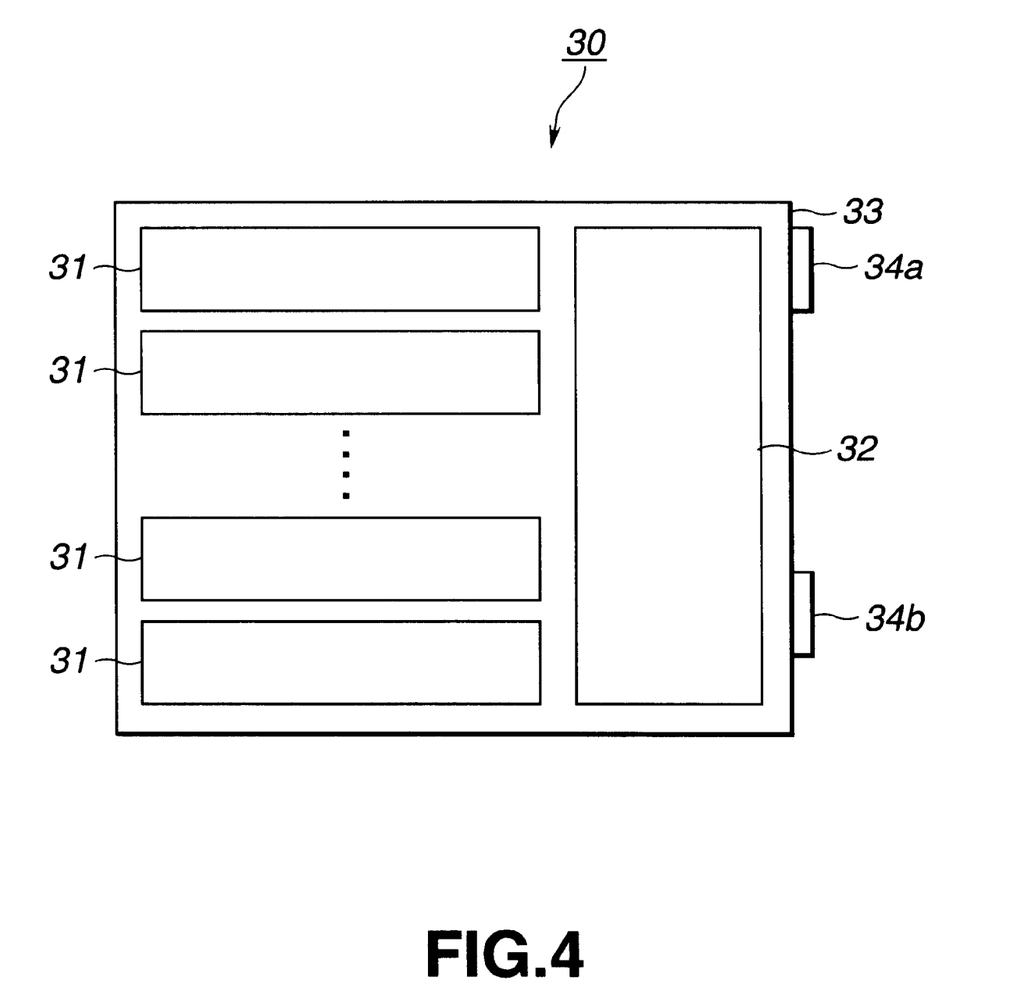
FIG. 4 is a schematic view of the internal structure of another embodiment of battery pack according to the present invention.

Next, another embodiment of battery pack according to the present invention will be described herebelow with reference to FIG. 4. The battery pack is generally indicated with a reference 30. As shown, the battery pack 30 incorporates a number n of cells 31 connected in series together (n is a natural number larger than 2), a control unit 32 to judge the status of each cell 31 in controlling the electrical connection between the cells 31, a container 33 to encase the number n of cells 31 and control unit 32, and external terminals 34 (positive terminal 34a and negative terminal 34b) disposed at one side of the container 33 for connection to a load apparatus or battery charger (not shown).

Figure 5:
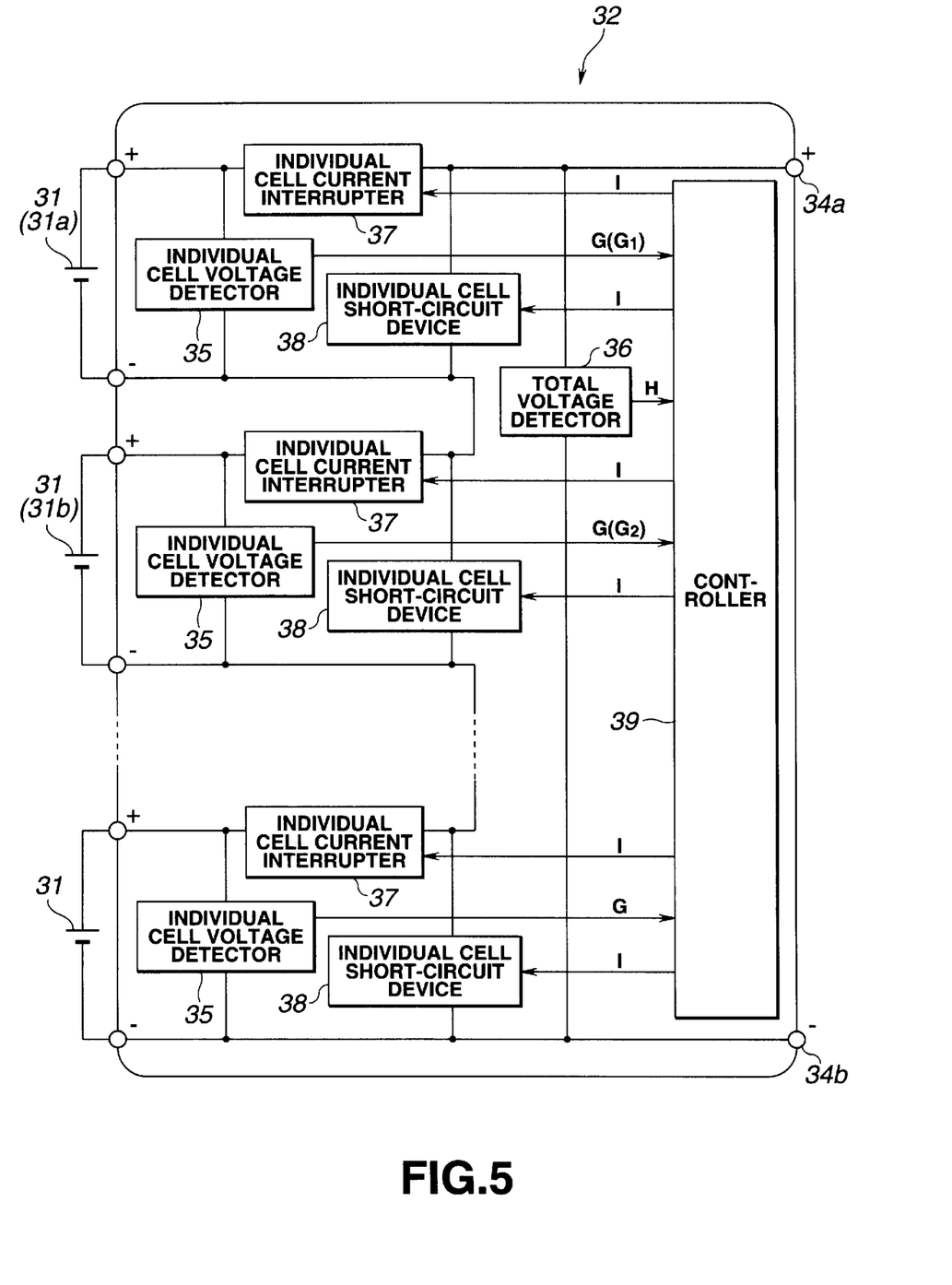
FIG. 5 is a circuit diagram of the battery pack in FIG. 4.

The cells 31 area a lithium-ion secondary cell similar to the aforementioned cell 2. As shown in FIG. 5, they are connected in series together by means of the control unit 32. It should be noted that although this embodiment uses a lithium-ion secondary cell for each cell 31, the cells 31 may not necessarily be a lithium-ion secondary cell but they may be any other secondary cell including a nickel-cadmium cell, nickel-hydrogen cell, lithium-polymer cell, lead cell or the like and also they may be a primary cell such as manganese cell, alkaline cell, lithium cell or the like.

The control unit 32 connects the number n of cells 31 in series to each other, measures a potential in each of the cells 31 included in he battery pack 30, and judges, based on the measured potential, the status of each cells 31, more particularly, whether each of the cells 1 is normal or faulty, to thereby control the connected status of the cells 31 in the battery pack 30.

The control unit 32 has provided therein individual cell voltage detectors 35 to measure a potential of the individual cells 31, and a total voltage detector 36 to measure the total voltage of the battery pack 30, namely, the total potential in the number n of cells 31 connected in series together. The individual cell voltage detectors 35 are connected in parallel to the individual cells 31, respectively. The total voltage detector 36 is connected in parallel to all the number n of cells 31 connected in series to each other.

Also, the control unit 32 has provided therein individual cell current interrupters 37 and individual cell short-circuit devices 38. The individual cell current interrupters 37 are connected in series to the cells 31, respectively. The individual current interrupters 37 are normally on, namely, normally closed-circuited. The individual cell short-circuit devices 38 are connected in parallel to the cells 31, respectively, via the individual cell current interrupters 38, respectively. The individual cell short-circuit devices 38 are normally off, namely, normally open-circuited.

Figure 6:
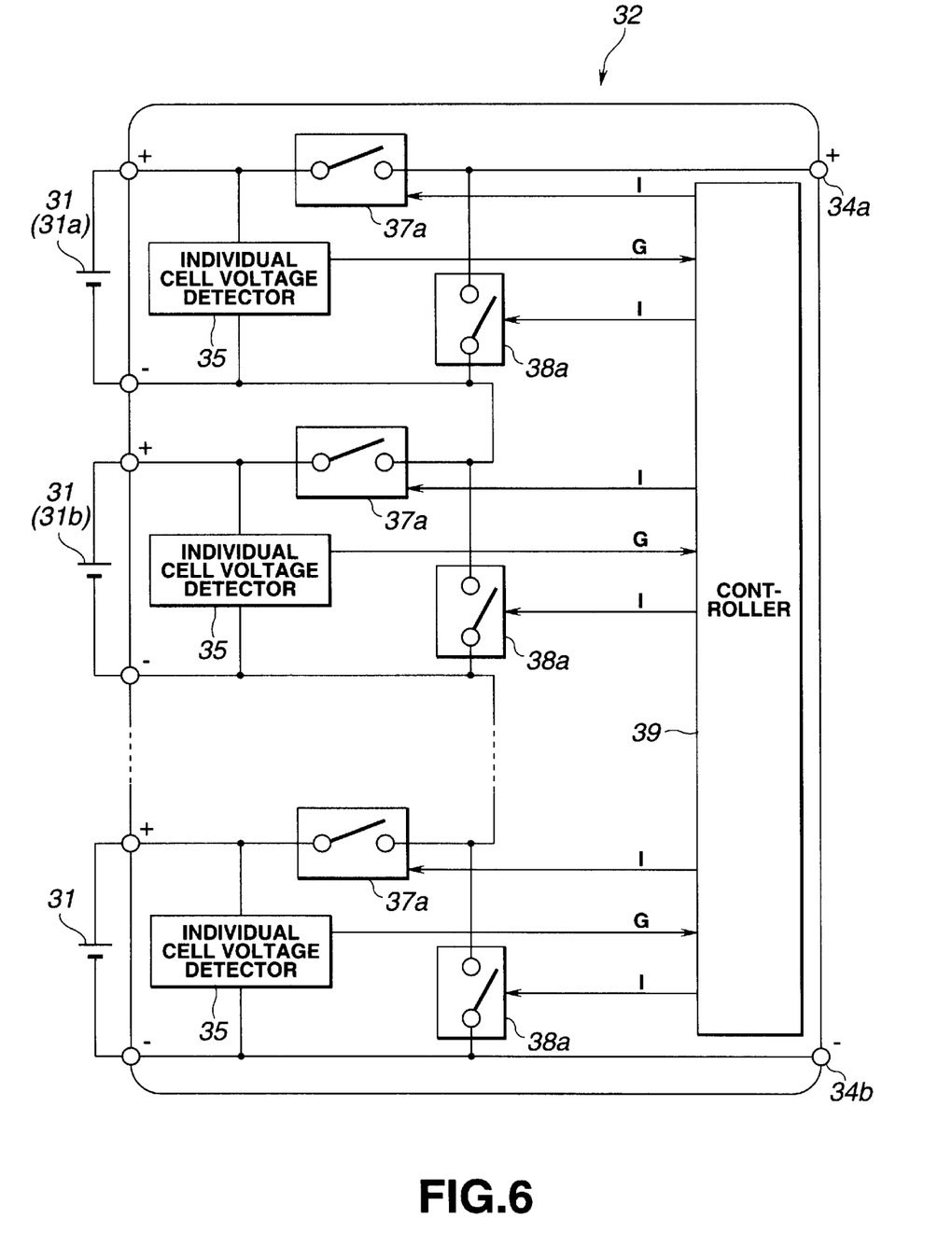
FIG. 6 is a circuit diagram of a battery pack in which resettable switching elements are used as a cell current interrupter and cell short-circuit device, respectively.
Figure 7:
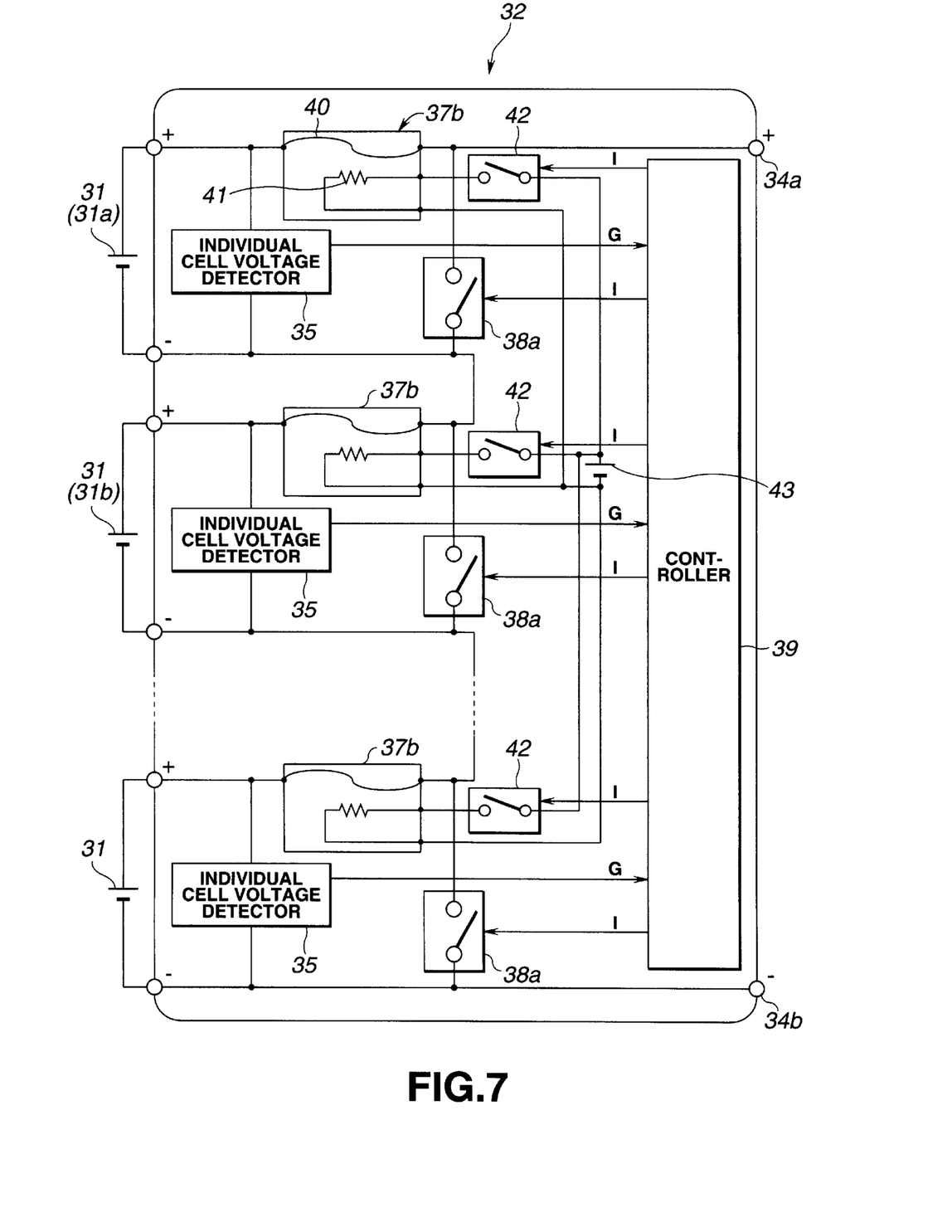
FIG. 7 is a circuit diagram of a battery pack in which a non-resettable interrupting element with heater is used as a cell short-circuit device.

The individual cell current interrupters 37 use each a resettable or non-resettable interrupter, for example, a resettable switching element 37a as shown in FIG. 6 or a non-resettable switching element 37b as shown in FIG. 7. In addition, the individual cell current interrupter 37 may be an electromagnetic relay, field-effect transistor, transistor or thyristor as a resettable interrupter, or an SC protector (by Sony Chemicals) as a non-resettable interrupter.

Similarly to the individual cell current interrupters 37, the individual cell short-circuit devices 38 use each a resettable or non-resettable short-circuit device, for example, a resettable switching element 38a or non-resettable switching element 38b, as mentioned above. Also, the individual cell short-circuit device 38 may be an electromagnetic relay, field-effect transistor, transistor or thyristor as a resettable interrupter or a non-resettable short-circuit device.

Further, the control unit 32 has provided therein a controller 39 which is supplied with voltage values from the individual cell voltage detectors 35 and total voltage detector 36, more specifically, individual cell voltage values G and total voltage value H, judges based on the voltage values whether each of the cells 31 is normal or faulty, and provides the individual cell current interrupters 37 and individual cell short-circuit devices 38 with an action command I. A reference voltage value J is preset for the controller 39 as a criterion for the controller 39 to judge whether each of the cells 31 is normal or faulty.

In the battery pack 30 equipped with the controller 32 constructed as having been described above, if any of the cells 31 becomes faulty, the fault is recognized, a current line to which the faulty cell 31 is connected is electrically disconnected, and a circuit portion corresponding to the current line thus disconnected is short-circuited to charge or discharge the other cells 31 which are not faulty.

In the aforementioned battery pack 30, it is judged as will be described below whether the cells 31 are normal or faulty. Individual cell voltage values G from the individual cell voltage detectors 35 are supplied to the controller 39 which will in turn judge, based on the individual cell voltage G, whether each of the cells 31 is normal or faulty. More particularly, the controller 39 in the battery pack 30 compares potentials of two cells 31, selected freely from the individual cell voltage values G from the individual cell voltage detectors 35, to calculate a difference between the two potentials. The controller 39 will further compare an absolute value of the difference between these individual voltage values G, with the reference voltage value J preset for the controller 39. When the absolute value is larger than the reference voltage value J, the controller 39 will judge that the cell 31 having provided the low individual voltage value G is faulty. For example, it is assumed here that the cells 31 provided in the battery pack 30, a cell 31a provides the controller 39 with a voltage value $G_1$ of 3 V and a cell 31b provides the controller 39 with a voltage value $G_2$ of 3.8 V. Namely, there is an absolute difference of 0.8 V between the voltage values $G_1$ and $G_2$. Also it is assumed that the reference voltage value J of 0.3 V is preset for the controller 39. In this case, the absolute difference of 0.8 V between the voltage values $G_1$ and $G_2$ is larger than the reference voltage value of 0.3 V, the controller 39 will judge either the cell 31a or 31b to be faulty and further that the cell 31a showing the lower individual voltage value G (3 V) is faulty. It should be noted that the total voltage detector 36 may be omitted from the battery pack 30 the controller 39 is intended to judge only whether the cells are normal or faulty as mentioned above.

Also, in the battery pack 30, the individual cell voltage values G from the individual cell voltage detectors 37 and total voltage value H from the total voltage detector 36 are used by the controller 39 in a different manner to judge whether the cells 31 are normal or faulty. More specifically, the controller 39 in the battery pack 30 divides the total voltage value H from the total voltage detector 36 by a total number n of the cells 31 to calculate a mean voltage value and subtracts the mean voltage value each of the individual cell voltage values G from the individual cell voltage detectors 35 to calculate a difference between them. When the difference between the individual cell voltage G and mean voltage value is negative while an absolute value of the voltage difference is larger than the reference voltage value J preset for the controller 39, the latter will judge that the cell 31 providing the individual voltage value G is faulty. For example, it is assumed here for a battery pack 30 consisting of two cells 31a and 31b that the cell 31a provides a voltage value $G_1$ of 3 V, the cell 31b provides a voltage value $G_2$ of 3.8 V, and the whole battery pack 30 provides a total voltage H of 6.8 V. All these voltage values are provided to the controller 39. A reference voltage value J of 0.3 V is preset for the controller 39. In this case, the controller 39 calculates the individual voltage values $G_1$ and $G_2$ to determine a mean voltage value of 3.4 V. Further the controller 39 calculates a difference between the individual voltage value $G_1$ and mean voltage value and a difference between the individual voltage value $G_2$ and mean voltage value, compares an absolute value of the voltage difference with the reference voltage value J, and judges that the cell 31a having the voltage value $G_1$ whose difference from the mean voltage value is negative and absolute value of the voltage difference is larger than the reference voltage value J is faulty while judging that the cell 31b providing the voltage value $G_2$ whose difference from the mean voltage value is positive is normal.

In the battery pack 30, when any one of the cells 31 is judged to be faulty as mentioned above, the controller 39 will issue an action command I to the individual cell current interrupters 37 and individual cell short-circuit devices 38 connected to the faulty cell 31. Then, the individual cell current interrupters 37 connected in series to the cells 31 and normally closed-circuited will be open-circuited while the individual cell short-circuit devices 38 connected in parallel to the cells 31 and normally open-circuited will be closed-circuited. When the individual cell current interrupters 37 and individual cell short-circuit devices 38 are thus changed in status, the current line connected to the cells 31 is opened by the individual cell current interrupters 37 and a bypass line parallel to the faulty cell 31 is closed by the individual cell short-circuit devices 38, so that the circuit corresponding to the current line connected to the disconnected cell 31 is short-circuited.

The short-circuiting in the battery pack 30 will further be described herebelow with reference to FIG. 6 concerning an example in which resettable switching elements 37a and 38a are used as the individual cell current interrupters 37 and individual cell short-circuit devices 38, respectively, as shown in FIG. 6.

In the battery pack 30, when the cell 31a, for example, of the cells 31 connected in series together is judged by the controller 39 to be faulty, the switching elements 37a and 38a connected to the cell 31a are supplied with an action command I from the controller 39. The switching element 37a will be opened-circuited while the switching element 38a is closed-circuited. In the battery pack 30, the switching elements 37a and 38a are thus changed in status, so that the current line connected to the faulty cell 31a will be open-circuited and there will be formed a charging current and discharging current bypass line to which the switching element 38a connected in parallel to the faulty cell 31a.

In case the switching elements 37a and 38b are used as in the above, when the cell 31a is recovered from the failure and thus becomes usable again, the switching elements 37a and 38a are changed in status to connect the cell 31a to the current line again so that the cell 31a will be put into circuit again.

The short-circuiting in the battery pack 30 will further be described herebelow with reference to FIG. 7 concerning an example in which non-resettable circuit interrupting element with heater 37b is used as the individual cell current interrupter 37 and the switching element 38a is used as the individual cell short-circuit device 38. As shown in FIG. 7, the circuit interrupting element with heater 37b is comprised of an interrupting element 40 and a heater 41 to which a DC source 43 disposed in the control unit 32 is connected via a switch 42.

In the battery pack 30, when the controller 39 judges that the cell 31a of the cells 31 connected in series together is faulty, it will issue an action command I to the switch 42 connecting the heater 41 and DC source 43 to each other and the switching element 38a. The switch 42 and switching element 38a will thus be changed in status. When the switch 42 is closed, the heater 41 is connected to the DC source 43 which will thus supply a current to the heater 41. Thus the heater 41 is energized to have a higher temperature. When the temperature of the heater 41 is elevated up to a point which the interrupting element 40 is blown, the interrupting element 40 will electrically be cut off. When the switching element 38a is closed-circuited, the charging current and discharging current bypassing line connected in parallel to the faulty cell 31a is formed.

As mentioned above, in the battery pack 30, the current line for the faulty cell 31a is broken while a current bypass line is formed for the normal cells 31, more particularly, the cells 31 other than the faulty cell 31a, so that a circuit portion corresponding to the current line to which the faulty cell 31a is connected is short-circuited. Thus, in the batter pack 30, when any of the plurality of cells 31 connected in series together becomes faulty, charging and discharging can be effected by only the normal cells 31.

In the aforementioned battery packs 1 (30), the fact that the failure of the cells 2 (31) can be detected may be utilized to inform the load apparatus or battery charger (not shown) of a number of faulty cells 2 (31). The battery charging informed of the failure of a cell 2 (31) is designed to change the value of charging voltage according to the number of faulty cells 2 (31) and the load apparatus is designed to correct and change parameters used for calculation of the loading characteristic, residual potential, etc.

As having been described in the foregoing, even if any of a plurality of cells composing a battery pack becomes faulty, only the faulty cell can electrically be disconnected from the normal ones which will thus used for charging and discharging. Therefore, the battery pack can be continuously used normally. It is possible to minimize the likelihood that the faulty cell generates abnormal heat, ejects gas, ignites or explodes, thereby assuring an enhanced reliability and safety of the battery pack.

In the above battery packs according to the present invention, it is possible to electrically disconnect any of the cells in one of the cell units from the other normal cells and disconnect as many cells as the faulty cells in the other cell units, thereby permitting to prevent a voltage imbalance between the cell units. Thus it is possible to assure an enhanced safety use of the battery pack.

What is claimed is:

1. A battery pack comprising:
   a plurality of cells arranged in parallel to each other;
   determining means for testing each cell in said plurality of cells by comparing the cell to a predetermined value of said cell to determine if the cell is faulty and outputting a signal indicating the faulty cell; and
   disconnecting means for electrically disconnecting each faulty cell from the other cells in said plurality of cells based on said signal.

2. The battery pack of claim 1, wherein said determining means comprises:
   current detecting means for detecting a current value of said battery pack and a current value of each cell of said plurality of cells; and
   comparing means for receiving the detected current value of said battery pack and the detected current value of each cell of said plurality of cells from said current detecting means and comparing the detected current values with respective current reference values to determine which cell in said plurality of cells is faulty.

3. The battery pack of claim 1, wherein said disconnecting means contains an interrupting element to electrically disconnect each faulty cell from the other cells.

4. The battery pack of claim 3, wherein said interrupting element is not re-connectable once the faulty cell is electronically disconnected by said disconnecting means.

5. The battery pack of claim 3, wherein said interrupting element is re-connectable after the faulty cell is recovered from a failure.

6. A battery pack comprising:
   a plurality of cell units;
   a plurality of cells in each cell unit arranged in parallel to each other;
   determining means for testing each cell in said plurality of cells to determine if the cell is faulty and outputting a signal indicating the faulty cell; and
   disconnecting means for electrically disconnecting each faulty cell from the other cells in a cell unit based on said signal and for electrically disconnecting a number of cells of a respective cell unit equal to the number of faulty cells in said cell unit.

7. The battery pack of claim 6, wherein said determining means comprises:
   current detecting means for detecting a current value of said battery pack and a current value of each cell of said plurality of cells; and
   comparing means for receiving the detected current value of said battery pack and the detected current value of each cell of said plurality of cells from said current detecting means and comparing the detected current values with respective current reference values to determine which cell of said plurality of cells is faulty.

8. The battery pack of claim 6, wherein said disconnecting means contains an interrupting element to electrically disconnect each faulty cell from the other cells in said cell unit.

9. The battery pack of claim 8, wherein said interrupting element is not re-connectable once the faulty cell is electronically disconnected by said disconnecting means.

10. The battery pack of claim 8, wherein said current interrupting element is re-connectable after the faulty cell is recovered from a failure.

11. A battery pack comprising:

a plurality of cells arranged in series to each other;

determining means for testing each cell in said plurality of cells to determine if the cell is faulty; and short circuiting means comprising:
 first switching means arranged in series with each cell; and
 second switching means arranged in parallel with each cell,
 wherein said first switching means switches from a connected position to a disconnected position and said second switching means switches from a disconnected position to a connected position when said determining means determines a faulty cell.

12. The battery pack of claim 11, wherein the determining means comprises:

voltage detecting means for detecting a voltage of each cell; and controlling means for comparing a difference between two detected voltage values detected by the voltage detecting means with a preset reference voltage in order to determine said faulty cell.

13. The battery pack of claim 11 wherein the determining means comprises:

voltage detecting means for detecting a voltage of each cell and a total voltage of said plurality of cells; and controlling means for obtaining a value resulting from a division of the total voltage by the total number of cells in said battery pack, calculating a difference between the voltage of each cell and said value resulting from said division, and comparing said difference with a preset reference voltage in order to determine said faulty cell.

14. The battery pack of claim 11, wherein said first switching means is a non-resettable switching means.

15. The battery pack of claim 11, wherein said first switching means is a resettable switching means.

16. The battery pack of claim 11, wherein said second switching means is a non-resettable switching means.

17. The battery pack of claim 11, wherein said second switching means is a resettable switching means.

* * * * *